United States Patent [19]
Engalitcheff, Jr. et al.

[11] 3,804,389
[45] Apr. 16, 1974

[54] WET DECK FILL SECTION

[75] Inventors: John Engalitcheff, Jr., Gibson Island; Thomas F. Facius, Baltimore; Wilson E. Bradley, Jr., Ellicott City, all of Md.

[73] Assignee: Baltimore Aircoil Company, Inc., Baltimore, Md.

[22] Filed: Apr. 19, 1972

[21] Appl. No.: 245,423

Related U.S. Application Data

[63] Continuation of Ser. No. 838,014, June 17, 1969, abandoned, which is a continuation of Ser. No. 706,004, Feb. 16, 1968, abandoned.

[52] U.S. Cl.............................. 261/111, 261/DIG. 11
[51] Int. Cl................................................. B01f 3/04
[58] Field of Search .......................... 261/108–113, 261/DIG. 11, 24–30; 55/240, 257, 291, 440, 442–446, 464, 465, DIG. 37; 62/89, 92, 109, 121, 304

[56] References Cited
UNITED STATES PATENTS

| | | |
|---|---|---|
| 2,273,357 | 2/1942 | Houlis............................ 55/257 X |
| 2,356,653 | 8/1944 | Cox................................ 261/111 |
| 2,573,491 | 10/1951 | Richardson...................... 261/22 |
| 3,084,918 | 4/1963 | Kohl et al........................ 261/112 |
| 3,132,190 | 5/1964 | Engalitcheff..................... 261/30 |
| 3,150,211 | 9/1964 | Murray et al.................... 261/112 |
| 3,266,553 | 8/1966 | Munters.......................... 159/4 |
| 2,783,982 | 3/1957 | Kahl............................... 261/112 X |

FOREIGN PATENTS OR APPLICATIONS

1,249,739  11/1960  France............................... 55/241

*Primary Examiner*—Frank W. Lutter
*Assistant Examiner*—Vincent Gifford
*Attorney, Agent, or Firm*—Michael C. Sudol, Jr.

[57] ABSTRACT

A wet deck fill unit for an evaporative cooler to present a large surface for the evaporation of heat from water gravitating over the surface. Each unit has a plurality of parallel spaced apart fill pieces, each piece having vertically extended margin portions connected by a curved central portion. There is a horizontally extending open zone having a height equal to at least one-half the height of the fill pieces between adjacent fill units to increase even distribution of water over the fill pieces below it.

2 Claims, 5 Drawing Figures

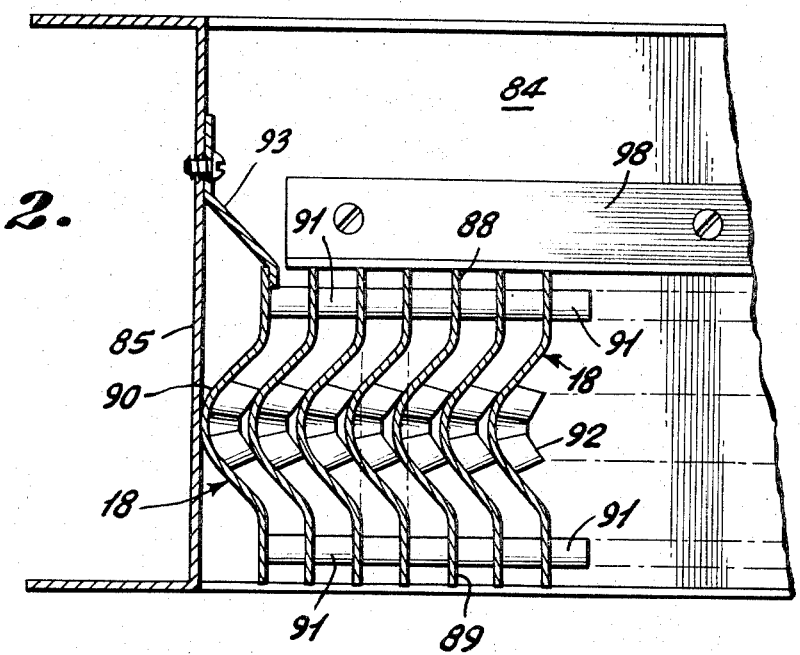
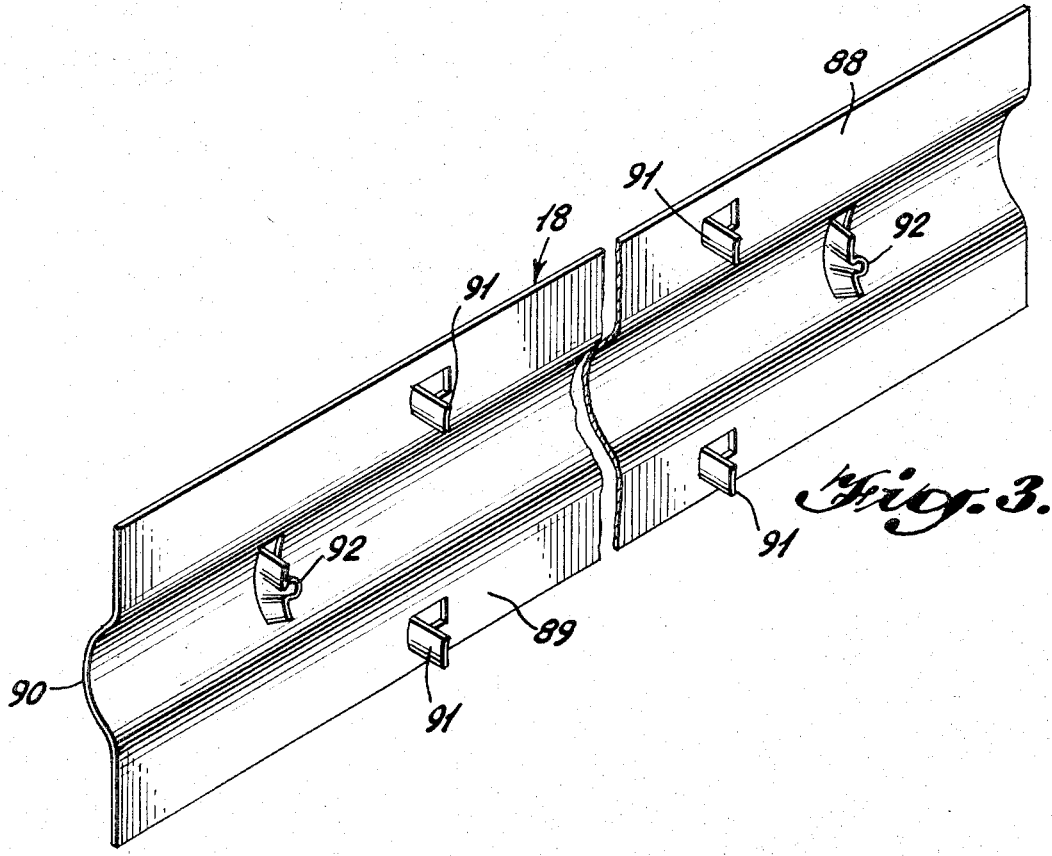

PATENTED APR 16 1974 3,804,389

WET DECK FILL SECTION

This application is a continuation of our copending application Ser. No. 838,014 filed June 17, 1969 and now abandoned which itself was a streamline continuation of Ser. No. 706,004 filed Feb. 16, 1968 and now abandoned.

This invention relates to a wet deck system to be used in cooling towers. In general, the wet deck systems in use today are the honeycomb cellular fill, wooden slats, or the more efficient corrugated or "wave-formed" material. The water to be cooled is distributed by spray nozzles, an example of which is described in U.S. Pat. No. 3,198,441 (the disclosure of which is hereby incorporated by reference) over the wet deck section and flows by gravity over the wet deck material and falls to the sump below from which it is subsequently recirculated. The air, flowing counter-current to the water, evaporates a portion of the water, the heat of vaporization being supplied by the remaining water. This process is an evaporative one, and for each pound of water that is evaporated, about 1,000 BTU's are extracted from the remaining water.

This invention concerns a cooling tower utilizing a new wet deck system. Although a "blow-through" (forced draft) cooling tower is used for illustrative purposes, it should be understood that this invention is equally applicable to the "draw-through" (induced draft) type equipment.

With this invention the wet deck is comprised of one or more surface units or modules. These surface modules are usually constructed of channel frame members in which the wet deck surface sheets are enclosed. These sheets are much shorter than those of the prior art. The surface sheets occupy approximately one-half the total module height. As one surface module is brought into vertical register with another module, the frame is built to create a small air plenum between the wet deck layers. The function of this space is to redistribute the water leaving the upper surface section before it contacts the next lower surface layer. Another important function of the air space is to provide additional capacity without the added cost of adding wet deck surface material. The water droplets leaving the surface are small, resembling a fine rain and provide a significant amount of exposed surface area. The air leaving a lower surface section contacts the surface area of the small droplets, extracting heat therefrom, before they congeal and fall onto that surface section. This process is repeated throughout the height of the tower until the desired cooled water temperature is obtained. It should be noted that the surface section modules of this invention are small in vertical height and therefore, a very important part of the present invention lies in the provision that the capacity of a given cooling tower can be varied in small incremental steps. The results are that a cooling tower can now be precisely tailored to any particular application without the problem and expense of using an oversized cooling tower which does not match the actual load conditions. Within limits, this new modular fill makes it possible to increase system capacity within a given cooling tower at a later date by simply adding the proper number of additional modules. The expense of purchasing an additional tower can be eliminated.

The shape of the wet deck material and the method in which it is placed within the module is extremely important for efficient cooling capacity. The surface sheets are shaped and spaced so that the air flowing through them increases its velocity for maximum turbulence and heat transfer and then smoothly decelerates with an accompanying static pressure increase as it leaves the exit portion of the surface sheets. The shape of the individual sheet is quite critical. If the air velocity between two adjacent surface sheets is too high, the falling water will actually be suspended (bridged across adjacent sheets) within the wet deck section, resulting in air flow obstruction and subsequent poor cooling efficiency. Each surface sheet is nested within an adjacent sheet.

It is therefore an object of this invention to provide a wet deck fill unit which will more evenly distribute the gravitating water over the surface sheets thereof but necessitate the use of less construction material.

Another object of this invention is to provide a wet deck surface for a cooling tower which can be readily varied in capacity by adding or subtracting modular units.

Other objects and advantages of this invention will be apparent upon consideration of the following detailed description of several embodiments thereof in conjunction with the next drawings wherein:

FIG. 2 is an end view in section of a wet deck fill unit;

FIG. 3 is a perspective view of a single surface element of the type shown in FIG. 2;

Figure 1:
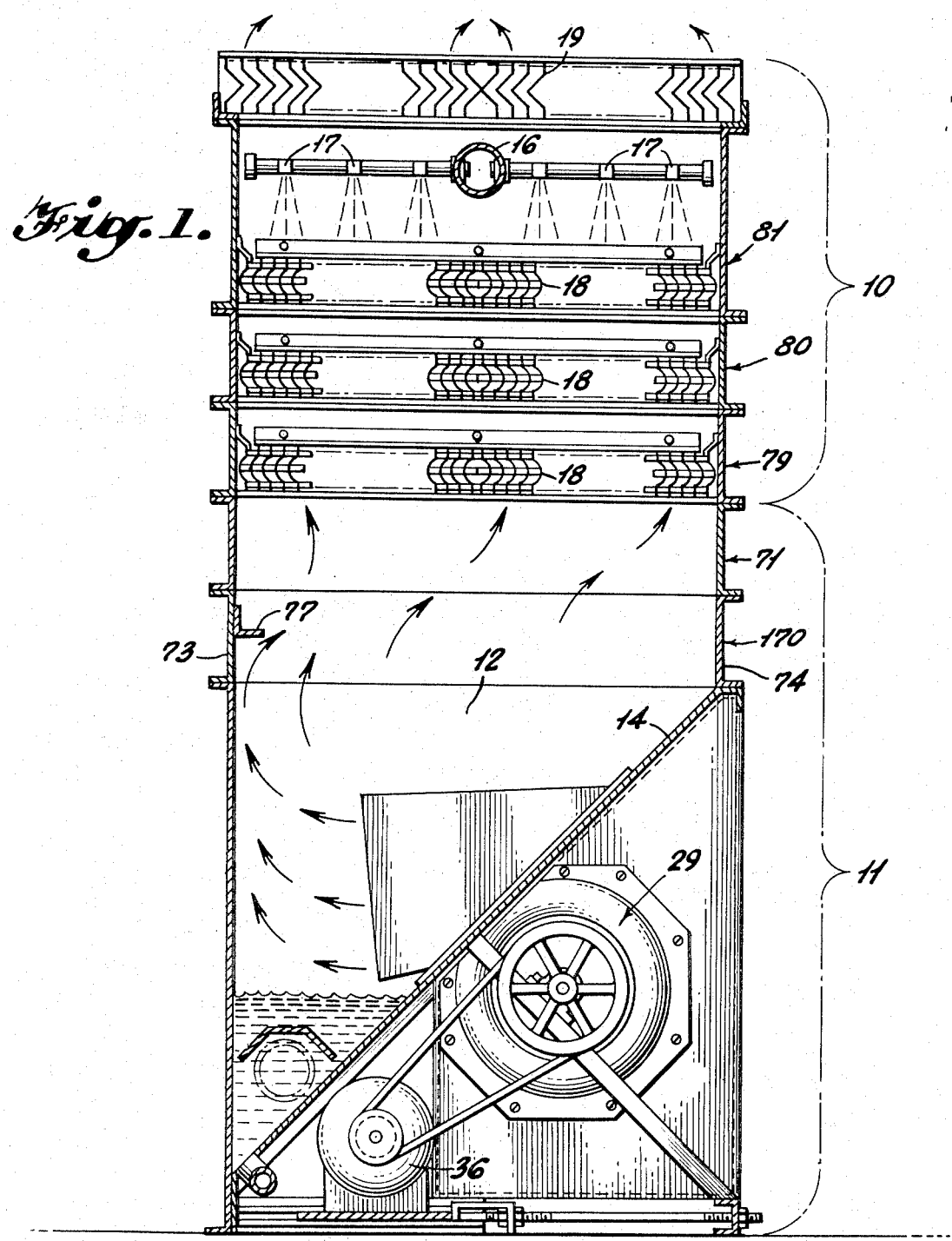
FIG. 1 is a view in section side elevation of a cooling tower containing the wet deck fill section of this invention.

Referring now to the drawings in greater detail, it should first be understood that FIG. 1 depicts a blow-through (forced draft) type cooling tower. The particular blower and V-sump arrangement shown here is described in greater detail in assignees' U. S. Pat. No. 3,442,494 entitled "Evaporative Heat Exchange Apparatus." Obviously, this particular blower arrangement need not necessarily be used with this wet deck. The wet deck could be used with any centrifugal fan or propeller fan arrangement whether it be blow-through (forced draft) or draw-through (induced draft). For the sake of convenience, only one particular type of blower arrangement is shown here.

An air flow is established by blower 29 which is powered by electric motor 36. That air flow, through means such as described in the previously mentioned U. S. Pat. No. 3,442,494, will be spread evenly over the surface of the lowermost fill section 79. Water containing heat which needs to be extracted will be distributed over the top of the fill pieces through spray header 16 and spray nozzles 17 in a fine even mist. If this mist could be maintained in a cooling tower, very high efficiency in a small area could be obtained, since a very large surface of water is exposed. Such an attempt is made in a spray filled tower but unfortunately the water droplets soon congeal to form larger and larger drops. This invention utilizes the efficiency of the fine mist directly under spray nozzles and then as soon as the droplets begin to congeal, in say 4 to 6 inches, the first layer of fill pieces 18 is introduced. The water falls on the fill pieces, thus creating a uniform thin film of water over the top fill section 80. This fill section contains a large number of sheet metal elements 18 held by frames in horizontally and vertically spaced relation to present to the water in total a large surface area. After the water has passed over the surface area of a fill piece 18 and lost some heat, it leaves the lower margin 89 in the form of small drops approaching the conditions present directly below the spray heads. These small drops then present a very large surface to the upflowing air resulting in an efficient heat transfer zone. When the small drops begin to congeal once again another layer of fill pieces is introduced. The water, after flowing through as many fill units as may be necessary in order to accomplish the desired cooling, falls by gravity into the V-sump 11.

Above the combination blower, sump and plenum sections, there are three wet deck modules 79, 80 and 81 arranged in superimposed relationship. Frames 79 and 80 are modular units interchangeable with each other. Consequently, frame 79 will be described in detail with the understanding that the description is equally applicable to frame 80.

Frame 79 is illustrated in FIGS. 1, 2, 4 and 5. As can be seen upon reference to FIG. 5, the margins of frame 79 are made up of four channel members 83, 84, 85 and 86.

The sheet metal fill elements 18 may be easily installed and supported within a frame such as frame 79. Note from reference to FIG. 3 that each element 18 includes upper and lower straight marginal portions 88 and 89 and an intermediate curved portion 90. Pierced and formed from the marginal portions 88 and 89 are spacing tabs 91. Tabs 92 of equal effective height are pierced and formed to project from the concave side of curved portion 90, the peculiar cross section of these tabs resulting from accommodation of the curvature of the metal from which they are formed. Because of the tabs 91 and 92, there is no need to provide any spacing arrangement in the supporting frame 79. As can be seen from FIGS. 2 and 5, the sheet metal fill pieces 18 are inserted to lie parallel to the channel members 85 and 86. The outermost fill piece 18 is held under a retaining strip such as 93, and the remaining fill pieces are laid side by side, self-spacing being accomplished by the tabs 91 and 92. Midway between the channel 85 and the channel 86 are two adjacent fill pieces arranged with their respective concave portion 90 facing one another (see FIG. 1). This means that at any channel section 85 or 86 running parallel to the fill piece, the fill piece has the convex side of its curved portion 90 touching the channel section.

Retaining strips 93, in the shape of Z-bars, perform a dual function. First they divert any water running down the inside walls of the wet deck assembly back into the air stream for proper distribution. Secondly they position and hold firmly the fill piece adjacent to the channel so that its convex portion faces away from the center. This arrangement maintains a uniform air velocity across the entire face of the wet deck module.

The arrangement just described makes the assembly of a module such as frame 79 convenient and economical. Note that the channel members 83 and 84 are arranged with the flanges extending inwardly. One of the modules is assembled, by inserting fill pieces 18 into a U-formed by one of the side channels 85 or 86 and end channels 83 and 84. The fill pieces 18 rest on the inwardly extending flanges of the end channels 83 and 84. After half the fill pieces have been inserted the remaining pieces are inserted in the opposite direction to accomplish the redistribution described above. After the remaining fill pieces are inserted, the remaining side channel member is bolted in position. Once the pack of fill pieces is assembled, hold-down strips 97 and 98 are fastened to end walls 83 and 84, the flanges of these strips bearing upon the end upper edges of the various fill pieces to hold them in position so that the module as a whole may be moved about and handled as a unit before assembly.

Figure 5:
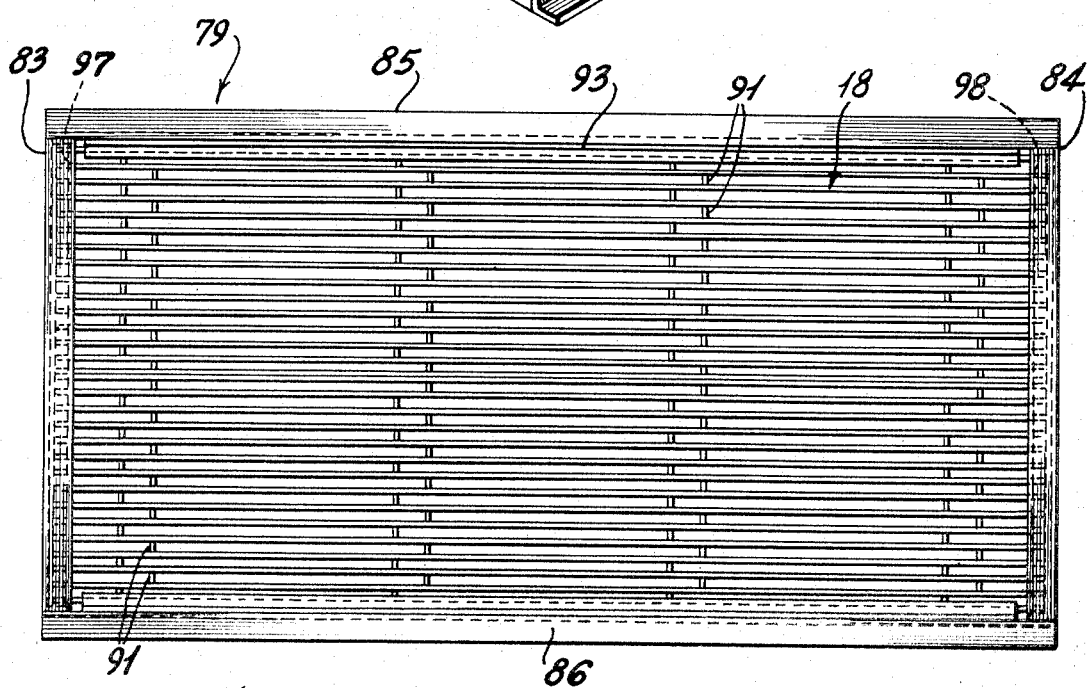
FIG. 5 is a top view of an assembled fill unit over which the water is spread for evaporative cooling.

As can be observed in reference to FIG. 5, the fill pieces 18 are not made identical to one another, but are usually made with the spacing tabs 91 and 92 of adjacent pieces 18 offset so as to keep a spacing tab from going into the punched-out region in an adjacent fill piece.

In construction of a fill or wet deck surface, the prior art has used a sheet which is orientated in the direction of the air flow and is continuous throughout the height of the wet deck section. That is, there is no vertical space between layers of fill as in the present invention. In the prior art, tall stacks of wet deck surface plates would not only require large amounts of material to fabricate, but were inefficient in proportion to the amount of material used due to the water "rivering" or running together near the bottom of the sheets.

Ideally the water running over a surface sheet should remain evenly distributed in a thin film on both sides over the entire surface. In construction of the wet deck surface of this invention, the maintenance of this even film has been improved considerably by limiting the height of each fill piece. Thus, in a present preferred embodiment a height of 4 to 5 inches for each wet deck fill piece was used. A vertically extending open area or plenum between wet deck modules of approximately the same vertical height as a fill piece (between ½ and 1½ times the height) serves as a redistribution zone where the gravitating water is evenly distributed over the surface of the next lower fill unit when it again forms a think film over the fill pieces 18 thereof.

In design of the fill pieces 18, it has been found that several critical factors must be observed. Since the air passing between adjacent fill pieces only "sees" a passage which is normal to the spacing between adjacent pieces, turbulence in that air can be created by corrugations which are similar in each piece. If the concavo-convex curved portion 90 which forms the corrugations is bent too sharply the water film cannot follow around the curve. Still, as sharp a bend as possible is desirable in order to create maximum air/water contact and achieve maximum scrubbing of the air against the water surface and then smoothly decelerates it with an accompanying small static pressure regain just before it leaves the upper edge of the fill pieces. A principal radius of curvature of between five-eighths inch and seven-eighths inch has been found effective with a ½ to ¾ secondary radii where the curved portion joins the marginal portions 88 and 89 on a fill piece with a height of 4¼ to 4½ inches.

The spacing between adjacent fill pieces has been found to be best at about one-half to seven-eighths inch. Closer spacing creates "damming" where the water will bridge across between adjacent pieces; wider spacing has been found to be less efficient. It is desirable to space the fill pieces so that a certain amount of "nesting" takes place, that is, the convex side of curved portion 90 extends into the concave portion of an adjacent fill piece. Thus, if a straight line were drawn to connect marginal portions 88 and 89 and any particular fill piece 18, it would be found that, ideally, the convex portion of curve 90 of the adjacent piece would overlap that line a distance equal to about 30 percent of the horizontal distance between adjacent fill pieces.

By way of example, in order to disclose a preferred embodiment, in a particular case a fill piece 18 was made to a finished height of 4⅜ inches, a principal curve radius of twenty-five thirty-seconds inch and secondary curve radii of twenty-one thirty-seconds, inch, leaving a total curved length of 2.67 inches and straight margin portions tangent these to each 0.853 inch. Tabs 91 were 0.626 inch long to maintain horizontal spacing between adjacent fill pieces.

Figure 4:
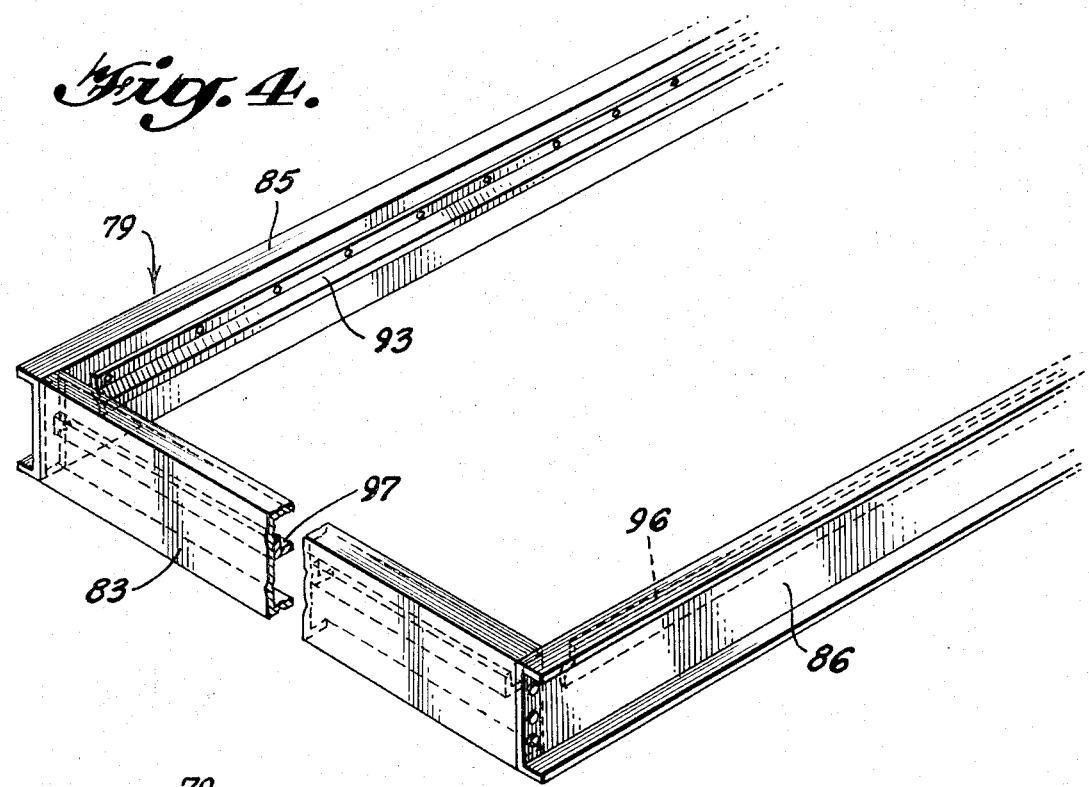
FIG. 4 is a perspective view of the fill holding framework of a fill module, the surface elements themselves being omitted for convenience of illustration.

The frame 81 is not identical to the frames 79 and 80 but instead, is about twice as high. This is because the frame 81 not only has to accommodate a layer of fill, but also must accommodate the manifold 16 and the various pipes 27 which extend from it. Frame 81 is internally provided with flanges and hold-down devices such as 93 and 96, and 97 and 98, as shown in FIG. 4. Te fill pieces 18 are inserted in the upper unit 81 in the same manner as in units 79 and 80, the principal difference being that they occupy a lesser part of the total volume encompassed by the frame.

These wet deck modules can then be bolted together in registry above any suitable sump with either a blow-through (forced draft) or draw-through (induced draft) air supply with as many modules as necessary to accomplish the desired cooling.

Although a specific preferred embodiment has been described, it is to be understood that modifications within the scope of one skilled in the art are contemplated to be with the preview of this invention.

What is claimed is:

1. A wet deck section for an evaporative cooler comprising two fill units defining an open zone therebetween, each fill unit having a plurality of fill pieces lying in substantially parallel spaced relationship, each piece being a vertically short elongated strip having vertically extending margin portions, one above the other, interconnected by a single curved central portion, said curved central portion having a principal radius of curvature of between five-eighths inch and seven-eigths inch at its central region and secondary radii of curvature of one-half inch to three-fourths inch at its region adjacent the margin portions, said curved central portions being nested so that the convex side of the curved central portion of one fill piece extends into the concave portion of an adjacent fill piece and said fill pieces being spaced no more than seven-eighths inch apart to cause air to wipe the curved surface, said fill pieces being further spaced apart at least one-half inch so as to prevent water bridging between adjacent pieces, and means to maintain said open zone between said fill units of a height at least equal to one-half the height of said fill pieces, the pieces constituting at least one of the fill units being so disposed that the curved central portions are in horizontal alignment with the outward curves all facing away from the center of the unit as viewed in end section so that two inward curves face each other near the center line of the section.

2. A wet deck section as claimed in claim 1 wherein the fill pieces are provided with integral means for orienting themselves in relation to each other, said integral means being displaced from the plane of the fill pieces.

* * * * *